United States Patent
Bennett et al.

(10) Patent No.: US 6,722,184 B2
(45) Date of Patent: Apr. 20, 2004

(54) APPARATUS AND METHOD FOR PRESSURIZED OXYGEN BULB CURING AND TESTING

(75) Inventors: Bradford A. Bennett, Indianapolis, IN (US); Nicholas A. Skwiat, Noblesville, IN (US); Paul L. Geise, Indianapolis, IN (US)

(73) Assignee: Guide Corporation, Pendleton, IN (US)

( * ) Notice: Subject to any disclaimer, the term of this patent is extended or adjusted under 35 U.S.C. 154(b) by 0 days.

(21) Appl. No.: 10/238,203

(22) Filed: Sep. 10, 2002

(65) Prior Publication Data

US 2003/0046981 A1 Mar. 13, 2003

Related U.S. Application Data

(60) Provisional application No. 60/318,781, filed on Sep. 13, 2001.

(51) Int. Cl.[7] ............... G01M 3/02; G01M 3/04; F23Q 23/08
(52) U.S. Cl. .............. 73/37; 73/52; 73/40.7; 445/3; 324/414
(58) Field of Search ............. 73/37, 52, 49.2, 73/40.7; 324/414; 445/3

(56) References Cited

U.S. PATENT DOCUMENTS

| | | | |
|---|---|---|---|
| 374,850 A | * | 12/1887 | Reinmann ............ 73/45.5 |
| 3,407,123 A | | 10/1968 | Peterson |
| 3,738,158 A | * | 6/1973 | Farrell et al. ........... 73/40.7 |
| 3,855,844 A | | 12/1974 | Craig |
| 3,888,111 A | | 6/1975 | Craig |
| 3,949,596 A | | 4/1976 | Hawk |
| 3,991,622 A | | 11/1976 | Oowada |
| 4,031,742 A | | 6/1977 | Michael et al. |
| 4,055,984 A | | 11/1977 | Marx |
| 4,426,876 A | | 1/1984 | Kakumoto |
| 4,578,043 A | * | 3/1986 | Teshima et al. ........ 445/40 |
| 4,590,429 A | * | 5/1986 | Sell .................. 324/414 |
| 4,720,652 A | | 1/1988 | DuBois, Jr. |
| 4,803,868 A | | 2/1989 | Vinton et al. |
| 4,831,870 A | | 5/1989 | Smith |
| 5,058,420 A | | 10/1991 | Vali et al. |
| 5,083,957 A | | 1/1992 | Bolz et al. |
| 5,105,654 A | | 4/1992 | Maruyama et al. |
| 5,128,106 A | | 7/1992 | Buschmann et al. |
| 5,205,157 A | | 4/1993 | McDaniel |
| 5,226,316 A | | 7/1993 | Mally et al. |
| 5,263,361 A | | 11/1993 | Gates |
| 5,369,983 A | * | 12/1994 | Grenfell ............. 73/40.7 |
| 5,929,367 A | * | 7/1999 | Neff et al. .......... 102/202.7 |
| 5,939,620 A | | 8/1999 | Strand |
| 6,089,282 A | * | 7/2000 | Spiegelman et al. ...... 141/8 |
| 6,202,477 B1 | | 3/2001 | Lehmann |

FOREIGN PATENT DOCUMENTS

| | | | |
|---|---|---|---|
| EP | 89302850.6 | 2/1990 | |
| JP | 01015626 A | * 1/1989 | ............ 73/52 |
| JP | 08346832 | 7/1998 | |
| WO | WO 98/31966 | 7/1998 | |

* cited by examiner

Primary Examiner—Michael Cygan
(74) Attorney, Agent, or Firm—Jay G. Taylor; Alexander D. Forman

(57) ABSTRACT

An apparatus and method for testing one or more glass light bulbs assembled into a sub-assembly for cracks. The apparatus comprises a chamber having an enclosed hollow interior and a door that is adapted to open and close to either allow access to the hollow interior or to seal the hollow interior; a test tray assembly having a plurality of compartments for receiving and holding a plurality of glass light bulbs and sub-assemblies to be tested, said tray assembly adapted and dimensioned to be placed into and enclosed by said chamber; a control assembly for controlling the introduction of oxygen into said chamber; and a source of pressurized oxygen connected to said chamber to supply oxygen under pressure to said chamber under the control of said control assembly.

12 Claims, 5 Drawing Sheets

APPARATUS AND METHOD FOR PRESSURIZED OXYGEN BULB CURING AND TESTING

CROSS-REFERENCE TO RELATED APPLICATIONS

This application claims the benefit of U.S. Provisional Application No. 60/318,781 filed Sep. 13, 2001.

FIELD OF INVENTION

The present invention relates generally to automotive lighting assemblies. Specifically, the present invention relates to a testing apparatus and a method for checking leaks in glass-based light bulbs in automotive lighting assemblies.

BACKGROUND

One of the main components of an automotive lighting assembly is the light source. In many automotive lighting assemblies, the light source is a partially evacuated (about 0.6 atmosphere) glass-based light bulb having one or more filaments housed therein. A partial vacuum is necessary because the presence of too much oxygen within the light bulb oxidizes the filaments. Oxidation causes an electrical short in the filament, which in turn causes the filament to fail and the light bulb to become inoperable.

Light bulbs may be manually or automatically inserted into a variety of socket subassemblies and then assembled into a larger primary lighting assembly, such as, for example, automotive headlamp assemblies or traffic light assemblies. Socket subassemblies typically comprise a female receptacle into which the bulb is inserted to make an electrical connection and an electrical jack for connecting the bulb and socket to the electrical system of the automobile or apparatus. The socket typically can be inserted into a mating opening in the back of the light assembly so that the bulb is positioned in the assembly at approximately the optical focal point of the light assembly. Unfortunately, regardless of which socket assembly insertion method is used, some light bulbs are damaged severely enough by the insertion process that the final assembled lighting assembly, either initially or soon thereafter, fails to operate. Often this damage involves cracks in the light bulb that allow ambient oxygen to enter the light bulb and oxidize the filament or filaments. Thus, a need exists for a method and apparatus capable of determining whether the light bulb in a lighting assembly will fail, preferably before the lighting assembly is ultimately installed in a larger product, such as an automobile.

Several methods have been developed to determine whether cracks or other leaks are present in the light bulb of a lighting assembly. Window testing is one method known in the art for determining whether a light bulb will fail. The window testing method is generally used to test automotive headlamps. The window testing, an automotive headlamp bulb and socket are connected to a testing device prior to the headlamp bulb and socket's insertion into an automobile. The testing device comprises a power source for the headlamp bulb and a means for measuring the electrical current through the headlamp bulb. If the current through the headlamp bulb is lower than the normal expected current through the headlamp bulb, then oxidation of the filament may have occurred which signals the pending failure of the light bulb. Generally, if the current through the headlamp is less than approximately ninety percent (90%) of the normal expected current through the headlamp, the light bulb is considered to be unacceptable.

Slope testing is a second method known in the art for determining whether a particular light bulb in an automotive headlamp assembly will fail. In slope testing, an apparatus is used to conduct a three (3) second current test on the headlamp bulb. In this test, the headlamp bulb is connected to a power source and a current measuring device. The headlamp bulb is allowed to warm-up for a period of approximately one and one-half (1.5) seconds. During the next one and one-half (1.5) seconds, the current measuring device measures the current through the headlamp bulb to immediately after the current leaves the headlamp bulb in intervals of one one-hundredth ($\frac{1}{100}$) of a second. The slope of these measurements is then calculated. If the slope is negative, the headlamp fails the test. One skilled in the art will appreciate that both the window testing method and the slope testing method may be applied to lighting assemblies other than automotive lighting assemblies.

Generally, automotive lighting assemblies are tested within several hours of the insertion of light bulbs into the socket sub-assemblies and installation of the socket into the lighting assembly. In this time frame, the above-described testing methods will detect large cracks or leaks in the light bulbs, because a large leak will allow enough ambient oxygen to enter the light bulb to affect the window testing results or the slope testing results, even within such a short time after the insertion of the light bulb. However, a problem exists in detecting smaller cracks. Small cracks or leaks do not allow enough ambient oxygen into the light bulb to affect the results of window testing or slope testing for the first forty-eight (48) to seventy-two (72) hours after inserting the light bulb into the apparatus. While one could wait two (2) to three (3) days before testing an automotive lighting sub-assembly, it is impractical to retain the numerous automotive lighting assemblies that may be produced by a manufacturer each day for such time periods to test the function of the light bulbs contained therein. Thus, a need exists for a method and apparatus capable of detecting light bulb leaks immediately after their insertion into lighting sub-assemblies, especially automotive lighting sub-assemblies.

SUMMARY

The present invention comprises an apparatus that forces oxygen into cracks or other leaks, if present, in lighting assembly light bulbs, and a method for using the apparatus in detecting such light bulb cracks or leaks. By forcing oxygen under pressure into light bulbs via such cracks or leaks, subsequent window testing or slope testing conducted on a lighting assembly is immediately effective in showing cracks or leaks, even where only very small cracks in the light bulb exist and even when such tests are conducted only a short period of time after the light bulb is inserted into a lighting assembly.

The apparatus comprises a testing assembly having a sealed chamber with a door and a light bulb assembly tray of connected individual testing compartments. Lighting sub-assemblies, comprising a light bulb inserted into an electrical socket sub-assembly, are placed within the individual testing compartments of the light bulb assembly tray, and the light bulb assembly tray is inserted into the sealed chamber. The apparatus further comprises a control assembly having a main control switch and a control panel. The control assembly also comprises an electrical connection board and a gas connection board. Electrical connectors and gas tubes connect the testing assembly to the control assembly.

The sealed chamber is adapted to supply oxygen at a high pressure, provided that such pressure is maintained at a level that will not damage the light bulbs contained within the lighting assemblies. Once the bulbs have been "cured," i.e. pressurized with oxygen for a predetermined period of time, slope testing or window testing currents can be applied to the lighting assemblies to determine if failure is likely.

The testing method of the present invention provides a method of testing for cracks or leaks in light bulbs of lighting assemblies. In practice, the method provides for forcing oxygen into any cracks or leaks in the light bulbs of lighting assemblies, especially automotive lighting assemblies. The oxygen then reacts with light bulb filaments enough to immediately affect the results of subsequently conducted window testing or slope testing of the light bulbs. The testing method of the present invention makes even small leaks in light bulbs immediately detectable after curing. Thus, the number of automotive headlamps that will fail due to cracks or leaks after final assembly in automobiles is greatly reduced. Moreover, the present invention removes any need for a lighting assembly manufacturer to store lighting sub-assemblies for long periods of time to wait for small cracks or leaks to manifest themselves.

DESCRIPTION

Figure 1:
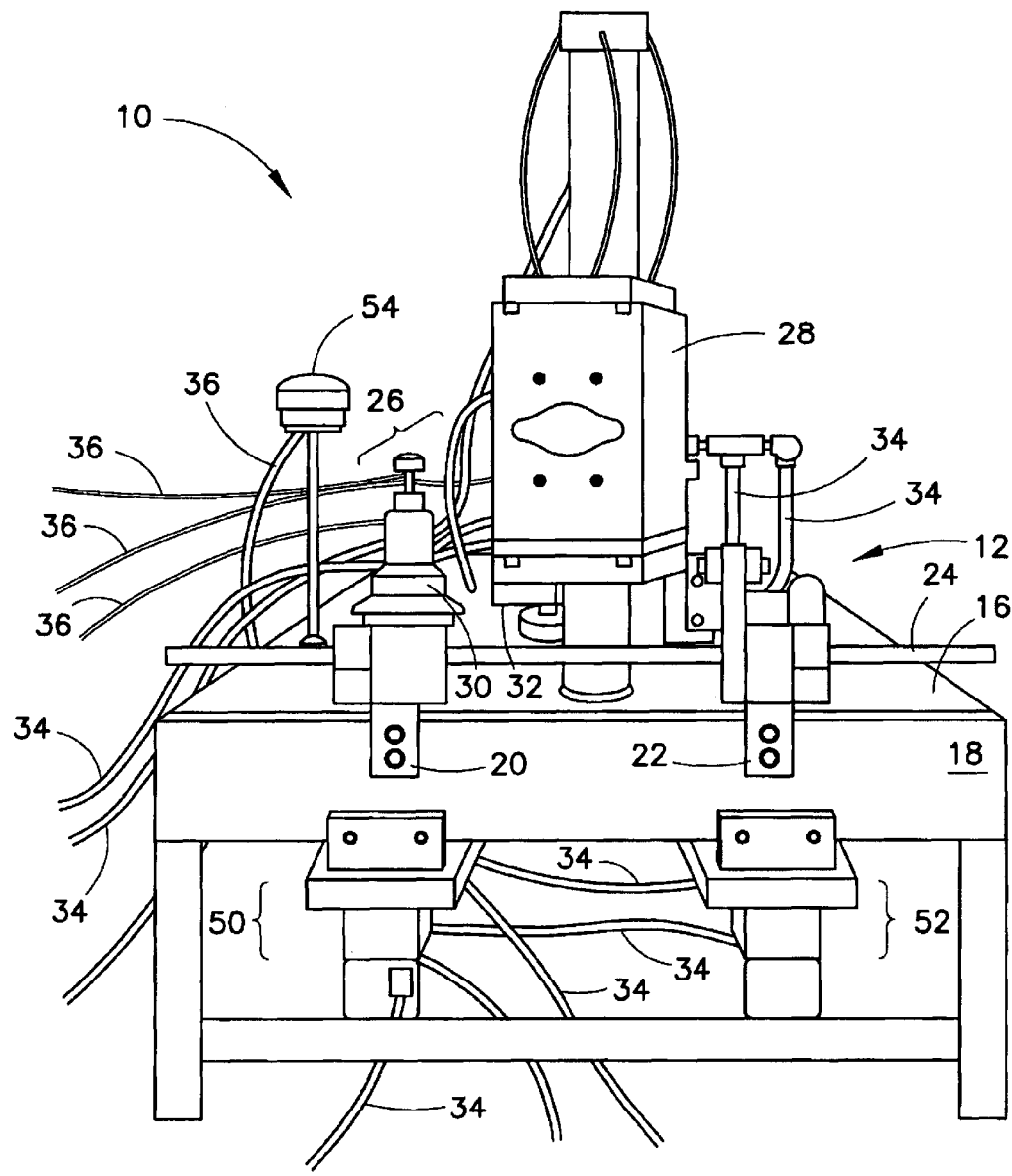
FIG. 1 is a partial front perspective view of a pressurized oxygen bulb curing apparatus.

Referring to FIG. 1, there is shown a front perspective view of a pressurized oxygen bulb testing apparatus 10 of the present invention. Pressurized oxygen bulb testing apparatus 10 comprises testing assembly 12, control assembly 14 (not shown in FIG. 1), and a plurality of gas tubes 34 and electrical connectors 36. As shown in FIG. 1, testing assembly 12 comprises a sealed chamber 16 having a door 18. Door 18, shown in FIG. 1 in a closed position, is connected to sealed chamber 16 with first hinge 20, second hinge 22 and rod 24. Additionally, door 18, as shown in FIG. 1, is locked into place by two shock pin cylinders 50 and 52.

Testing assembly 12 further comprises regulator sub-assembly 26 and temperature probe 54. Regulator sub-assembly 26 comprises housing 28, which houses an exhaust fan (not shown), first component 30 which is an over pressure relief valve, and second component 32 which is the oxygen intake valve. Temperature probe 54 monitors the internal temperature of sealed chamber 16 and is actuated by control assembly 14 and electrical connector 36.

Figure 2:
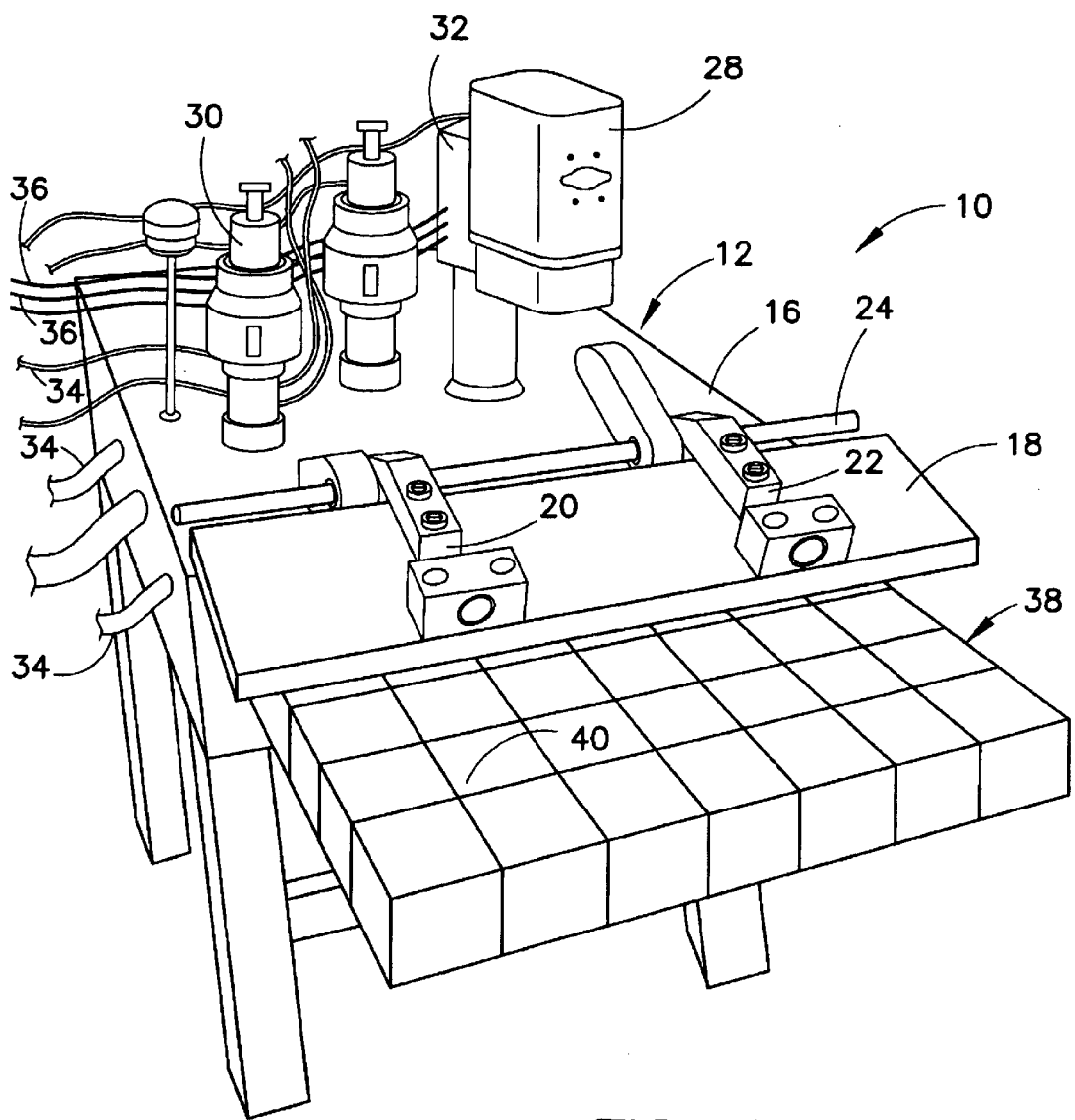
FIG. 2 is a partial top perspective view of the pressurized oxygen bulb curing apparatus of FIG. 1.

Referring to FIG. 2, there is shown a partial top perspective view of the pressurized oxygen bulb curing apparatus 10. In FIG. 2, door 18 is shown in an open position. Inside sealed chamber 16 there is shown light bulb assembly tray 38 (shown in FIG. 2 partially removed from sealed chamber 16). Light bulb assembly tray 38 comprises a plurality of testing compartments 40. Light bulb assembly tray 38 is sized in such a manner to allow light bulb assembly tray to slidably engage within sealed chamber 16. Each compartment 40 is sized to contain an electrical socket sub-assembly (not shown) and a light bulb (not shown) to be tested.

Figure 3:
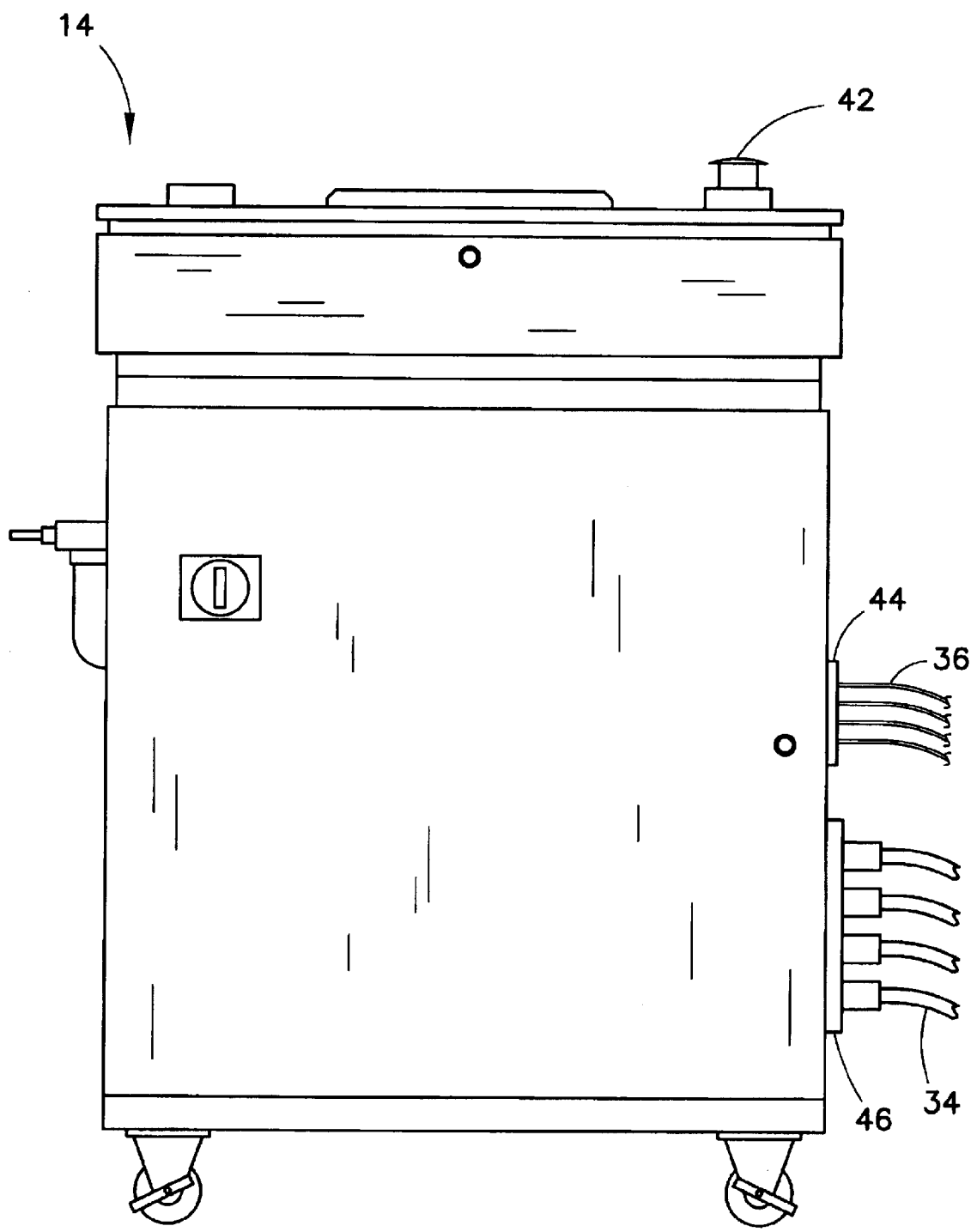
FIG. 3 is a front elevation view of a control assembly of the pressurized oxygen bulb curing apparatus.
Figure 4:
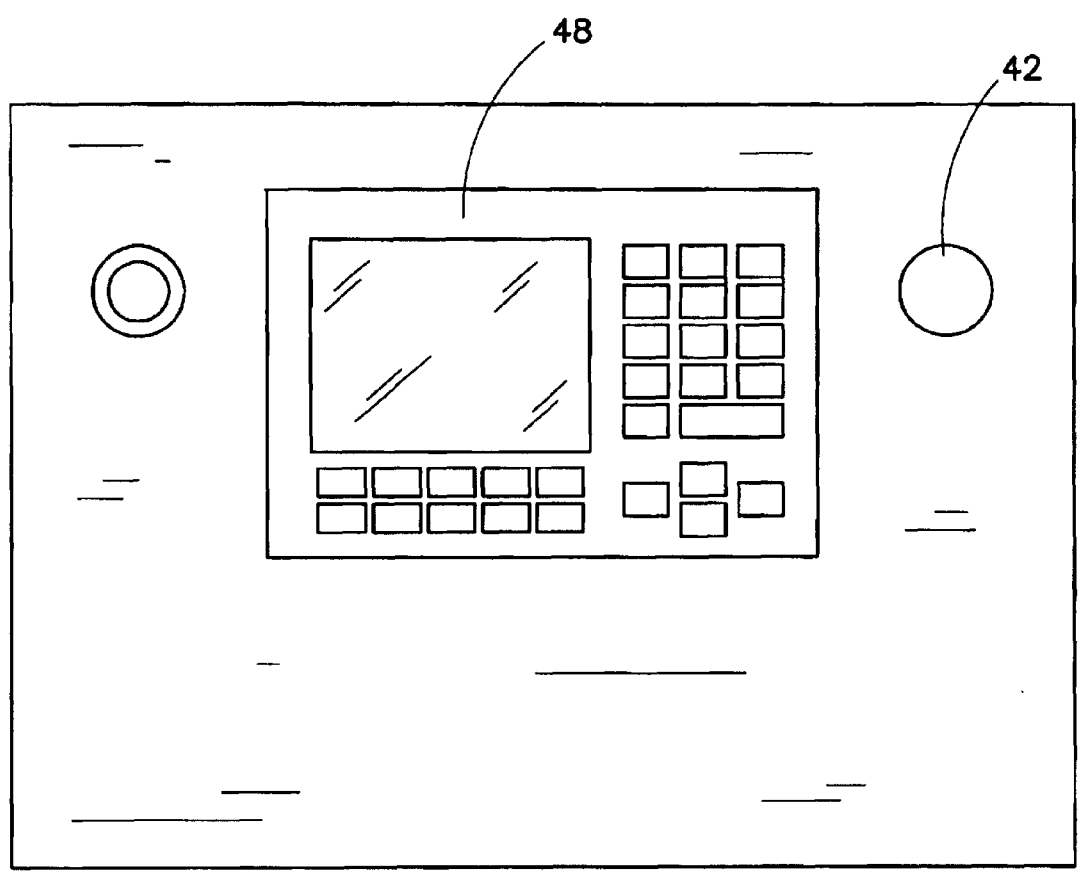
FIG. 4 is a top view of the control assembly of FIG. 3.
Figure 5:
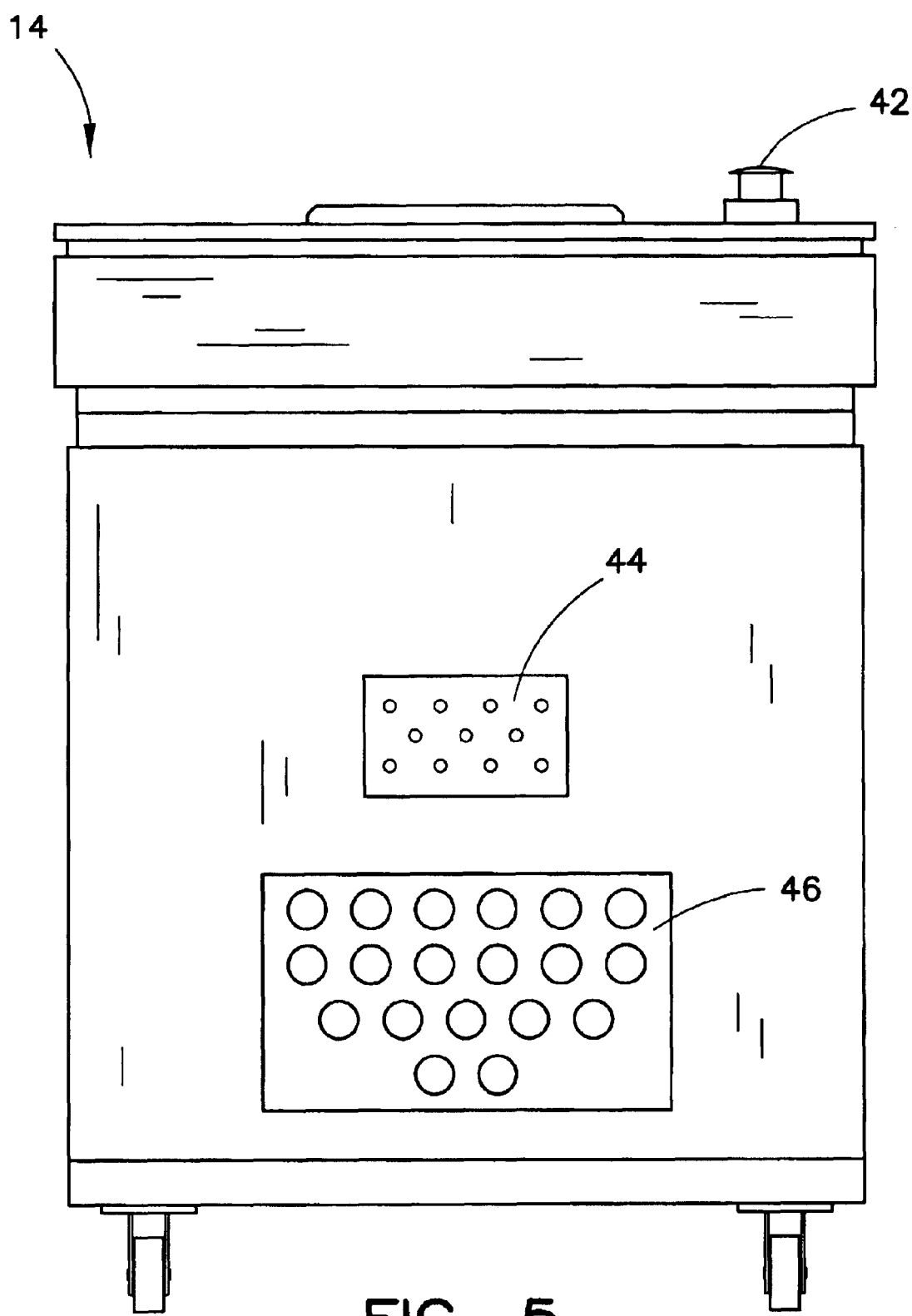
FIG. 5 is a side view of the control assembly of FIG. 3, without any electrical connectors or gas tubes shown for ease of reference.

Referring to FIG. 3, there is shown a front elevation view of control assembly 14 of pressurized oxygen bulb curing apparatus 10. Control assembly 14 comprises main control switch 42, electrical connection board 44 and gas connection board 46. Referring now to FIG. 4, control assembly 14 further comprises control panel 48. FIG. 5 shows a side view of control assembly 14 (without any electrical connectors or gas tubes shown for ease of reference). Control assembly 14 is connected to testing assembly 12 by gas tubes 34 and electrical connectors 36.

In operation, individual light bulbs are inserted into electrical socket sub-assemblies and placed into testing compartments 40. Light bulb assembly tray 38 is then slidably inserted into sealed chamber 16 and door 18 is moved to the closed position. Door 18 is actuated by control assembly 14 and gas tubes 34. The door is locked into place by shock pin cylinders 50 and 52, which are actuated by control assembly 14 and gas tubes 34. Using control assembly 14, and in particular control panel 48 and main control switch 42, an operator may then supply a pressurized, oxygen rich environment through oxygen intake valve 32 to sealed chamber 16 at the highest possible pressure that will not damage the light bulbs of the lighting assemblies. For automotive light bulbs, such pressure is generally about seventy-five (75) p.s.i. In practice, pressurized oxygen bulb curing apparatus 10 allows for a method to test for cracks and leaks in light bulbs. This method provides for forcing oxygen under pressure into any cracks or leaks in the light bulbs of the lighting sub-assemblies contained within testing compartments 40. The oxygen then reacts with light bulb filaments enough to immediately affect the results of subsequent window testing or slope testing.

While the present invention has been described in considerable detail with reference to a certain exemplary embodiment thereof, such is offered by way of non-limiting example of the invention as many other versions are possible. For example, while the invention is generally described herein with respect to automotive lighting assemblies, it will be appreciated by one having ordinary skill in the art that the invention is equally useful in testing for cracks or leaks in light bulbs for other lighting assemblies as well. By way of another example, while the exemplary embodiment contains a testing assembly and a control assembly, it is possible that these two elements of the invention could simply be combined into one assembly. It is anticipated that a variety of other modifications and changes will be apparent to those having ordinary skill in the art and that such modifications and changes are intended to be encompassed within the spirit and scope of the invention as defined by the appended claims.

We claim:

1. An apparatus for testing one or more glass light bulbs assembled into a subassembly for cracks comprising:

a chamber having an enclosed hollow interior and a door that is adapted to open to allow access to said hollow interior and to close to seal the hollow interior;

a test tray assembly adapted and dimensioned to be placed into and enclosed by said chamber and to receive and hold a plurality of glass light bulbs and subassemblies to be tested;

a control assembly for controlling the introduction of oxygen into said chamber; and a source of pressurized oxygen connected to said chamber and supplying oxygen at a maximum pressure to about 75 p.s.i. to said chamber under the control of said control assembly.

2. The apparatus of claim 1, further comprising an apparatus adapted to window test said light bulbs.

3. The apparatus of claim 1, further comprising an apparatus adapted to slope test said light bulbs.

4. A method of testing for cracks or leaks in at least one glass-based light bulb assembled into at least one lighting sub-assembly comprising the steps of:

provide a chamber having an enclosed hollow interior and a door that is adapted to open to allow access to said hollow interior and to close to seal said hollow interior;

providing a test tray assembly adapted and dimensioned to be placed into and enclosed by said chamber, wherein the test tray assembly holds at least one glass light bulb electrically connected to a lighting subassembly to be tested;

placing said tray assembly in said chamber;

closing said door to seal said chamber;

forcing pressurized oxygen through any crack or leak in any of the at least one glass light bulbs by supplying oxygen under pressure to said chamber;

supplying electrical test current to said the at least one bulb; and measuring current through the at least one bulb to determine if any of the at least one bulbs have a leak or crack that is likely to cause any of the at least one bulbs to fail.

5. The method of claim 4 wherein the at least one lighting sub-assembly is a socket assembly configured to be assembled into an automotive lighting assembly.

6. The method of claim 4 wherein the oxygen is supplied at a pressure of approximately 75 p.s.i. or less.

7. The method of claim 4 wherein the current through said bulbs is measured using a window testing device.

8. The method of claim 4 wherein the current through said bulbs is measured using a slope testing device.

9. An apparatus for testing one or more glass light bulbs assembled into a lighting subassembly for cracks or leaks, wherein the apparatus comprises:

a chamber having an enclosed hollow interior and a door that is adapted to open to allow access to said hollow interior and to close to seal the hollow interior;

a test tray assembly adapted and dimensioned to be placed into and to be enclosed by said chamber, wherein the test tray assembly holds at least one glass light bulb electrically connected to a lighting subassembly;

a control assembly for controlling the introduction of pressurized oxygen into said chamber; and a source of pressurized oxygen connected to said chamber and supplying pressurized oxygen to said chamber under the control of said control assembly;

wherein the pressurized oxygen in the chamber surrounds the exterior of the at least one light bulb and passes through any crack or leak in any of the at least one light bulbs.

10. The apparatus of claim 9, wherein said source of pressurized oxygen supplies said pressurized oxygen at a maximum pressure to about 75 p.s.i.

11. The apparatus of claim 9, further comprising an apparatus adapted to window test said light bulbs.

12. The apparatus of claim 9, further comprising an apparatus adapted to slope test said light bulbs.

* * * * *